(12) United States Patent
Hiratsuka (10) Patent No.: US 7,539,820 B2
(45) Date of Patent: May 26, 2009

(54) DISK DEVICE AND CONTROL METHOD FOR CACHE

(75) Inventor: Yukie Hiratsuka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 268 days.

(21) Appl. No.: 11/109,922

(22) Filed: Apr. 19, 2005

(65) Prior Publication Data

US 2005/0235108 A1    Oct. 20, 2005

(30) Foreign Application Priority Data

Apr. 20, 2004    (JP) .............................. 2004-123913

(51) Int. Cl.
*G06F 12/00* (2006.01)
(52) U.S. Cl. .................. 711/129; 711/137; 711/112
(58) Field of Classification Search ................ 711/129, 711/137, 112
See application file for complete search history.

(56) References Cited

U.S. PATENT DOCUMENTS

| | | | | |
|---|---|---|---|---|
| 6,092,149 | A * | 7/2000 | Hicken et al. ................ 711/113 |
| 6,526,225 | B1 * | 2/2003 | Windrem et al. ............ 386/125 |
| 6,694,407 | B1 * | 2/2004 | May et al. .................... 711/129 |
| 2002/0078300 | A1 * | 6/2002 | Dharap ........................ 711/133 |
| 2002/0116576 | A1 * | 8/2002 | Keshava et al. ............. 711/118 |

FOREIGN PATENT DOCUMENTS

| | | |
|---|---|---|
| JP | 05-189316 | 7/1993 |
| JP | 07-105095 | 4/1995 |
| JP | 10-254778 | 9/1998 |
| JP | 10-301847 | 11/1998 |
| JP | 2000-056993 | 2/2000 |
| JP | 2001-101076 | 4/2001 |

\* cited by examiner

*Primary Examiner*—Matt Kim
(74) *Attorney, Agent, or Firm*—Townsend and Townsend and Crew LLP; Patrick Duncan (57) ABSTRACT

Embodiments of the invention allow cache control optimized for the processing characteristics of application programs, and thus improve data transfer efficiency. In one embodiment, a disk device includes a disk; a cache for temporarily saving data that was read in from the disk, and data that was transferred from a host; and a controller for controlling data transfer between the cache and the host and between the cache and the disk; in which an independent cache area is set for each command type for application programs each different in data-processing policy can be set in the cache, and efficient read-ahead that utilizes the accessibility of the application programs each different in data-processing policy, can be realized by controlling the manner of read-ahead for each command type.

13 Claims, 12 Drawing Sheets

| Area type | Starting address | Ending address | Cache size | Another – area data Management table check flag |
|---|---|---|---|---|
| PC | 0 | 7812 | 4MB | 0 |
| AV | 7813 | 15625 | 4MB | 1 |

| Register | 7 | 6 | 5 | 4 | 3 | 2 | 1 | 0 |
|---|---|---|---|---|---|---|---|---|
| Features | | | | 34h | | | | |
| Sector count | 0 | 0 | 0 | 1 | 0 | 0 | 0 | 1 |
| Sector Number | | | | 0 | | | | |
| Cylinder low | | | | 0 | | | | |
| Cylinder High | | | | 0 | | | | |
| Device/ Head | 0 | 0 | 0 | DEV | 0 | 0 | 0 | 0 |
| Command | | | | EFh | | | | |

Fig. 10

| Command type | Issuance intervals (ms) of the latest 5 commands | | | | | Average issuance interval (ms) |
|---|---|---|---|---|---|---|
| PC | 10 | 80 | 50 | 40 | 20 | 40 |
| AV | 200 | 210 | 201 | 199 | 200 | 202 |

Fig. 11

| Area type | Latest-command receiving time (ms) | Write data transfer completion check flag | Latest-read-command termination check flag | Cache area usage duration (ms) |
|---|---|---|---|---|
| PC | 1000.2 | 1 | 1 | 1000ms |
| AV | 1010.2 | 0 | 0 | 2000ms |

DISK DEVICE AND CONTROL METHOD
FOR CACHE

CROSS-REFERENCES TO RELATED APPLICATIONS

This application claims priority from Japanese Patent Application No. JP2004-123913, filed Apr. 20, 2004, the entire disclosure of which is incorporated herein by reference.

BACKGROUND OF THE INVENTION

The present invention relates to cache control for transferring data from a hard disk to a cache efficiently, enhancing a hitting rate of the cache, shortening a command execution time, and enhancing a data transfer rate.

In a hard disk, the efficiency of data transfer to a host is improved by providing a cache, then transferring data from the disk to the cache, and managing the data so that the data can be transferred from the cache directly to the host. One cache area is further divided into several areas, and data to undergo a process of a different nature, or data of a different nature is written in a classified condition into each area. This improves the hitting rate of the cache, and enhances data transfer efficiency.

For example, there are schemes in which the hitting rate is improved by extracting random, sequential, or other access patterns, and allocating a cache area for each pattern. These cache control schemes are described in documents such as Patent Documents 1, 2, and 3. There is also a scheme in which data is distributed to two cache areas obtained by division based on statistical processing results relating to a data access status. Such a cache control scheme is described in Patent Document 4. In yet other schemes, cache areas are set and managed for each program or thread, for example, and these cache control schemes are described in documents such as Patent Documents 5 and 6. The Patent Documents are listed as follows:

Patent Document 1: Japanese Patent Laid-Open No. Hei 7-105095
Patent Document 2: Japanese Patent Laid-Open No. Hei 10-301847
Patent Document 3: Japanese Patent Laid-Open No. Hei 10-254778
Patent Document 4: Japanese Patent Laid-Open No. Hei 5-189316
Patent Document 5: Japanese Patent Laid-Open No. 2001-101076
Patent Document 6: Japanese Patent Laid-Open No. 2000-56993.

BRIEF SUMMARY OF THE INVENTION

To enhance the hitting rate of a cache, data most likely to hit needs to be read into the cache efficiently and to be preferentially left therein. The technologies described in Patent Documents 1, 2, and 3 have had the problem that in spite of cache areas being allocated and managed in accordance with the sequential, random, or other access patterns extracted by a control program, unequivocal access patterns must be extracted before cache data can be efficiently managed. For the technology described in Patent Document 4, there has been the problem that effects can be obtained only by using an access pattern intended to concentrate access on specific data. The technologies described in Patent Documents 5 and 6 have had the problem that although it is possible to manage a cache area for each program or thread and thus to enhance processing efficiency of the entire system that executes multiple application programs, the particular specifications of the system may not permit a new cache and/or its control device to be provided outside the disk for reasons such as costs. For these reasons, it is necessary to achieve, even in the disk device alone, more highly efficient control with the concept of processes or threads being kept in mind.

In view of the above problems, a first feature of the present invention is to allow cache control optimized for the processing characteristics of application programs each different in data-processing policy, by providing an independent cache area for each type of command for each of the application programs, and managing data. The difference in data-processing policy here refers to the difference in type between, for example, real-time processing and non-real-time processing.

A second feature of the present invention is to ensure more effective use of cache areas by making it possible, in order to accommodate time-varying changes in a command issuance status, to release a cache area previously allocated to a specific command type and then integrate this cache area with a cache area previously allocated to another command type.

A third feature of the present invention is to improve the hitting rate of a cache and enhance the data transfer rate of the disk device, by utilizing accessibility with each type of command and efficiently conducting a read-ahead operation on a cache area allocated to a specific command type.

In order to solve the above problems, the present invention has allowed a cache area to be set for each type of command for application programs each different in data-processing policy. More specifically, a disk device according to an embodiment of the present invention comprises: a disk; a cache memory for temporarily saving data that was read in from the disk, and data that was transferred from a host; and a controller for controlling data transfer between the cache memory and the host and between the cache memory and the disk. The disk device sets, in the cache memory, an independent cache area for each command type for application programs each different in data-processing policy, and includes a cache data management table for managing, the data written into the cache area for each cache area.

It has also been made possible to release a cache area previously allocated to each command type, and then integrate this cache area with a cache area allocated to another command type, according to the elapse of time from the latest command-receiving time for each command type or in accordance with an instruction from a host. In addition, selection of independent read-ahead methods for each command type has been made executable to allow efficient read-ahead that utilizes accessibility with each command type.

According to the present invention, it is possible to improve a cache-hitting rate, and enhance a data transfer rate, by setting a cache area for each type of command for application programs each different in data-processing policy, and further controlling the manner of read-ahead for each command type. Highly efficient data transfer can therefore be realized, for example, when simultaneously executing on a personal computer (PC), an audio/visual (AV) application program for a purpose such as dynamic image reproduction, and a PC application program for a purpose such as documentation.

DETAILED DESCRIPTION OF THE INVENTION

Embodiments of the present invention are described below using the accompanying drawings. These embodiments are described using, as typical types of commands, AV commands used mainly in audio/visual processing application programs, and PC commands used in document-processing application programs and program-developing application programs. The access tendency differs between the two types of commands: access with AV commands mainly tends to be sequential, and access with PC commands tends to be non-uniform.

Figure 1:
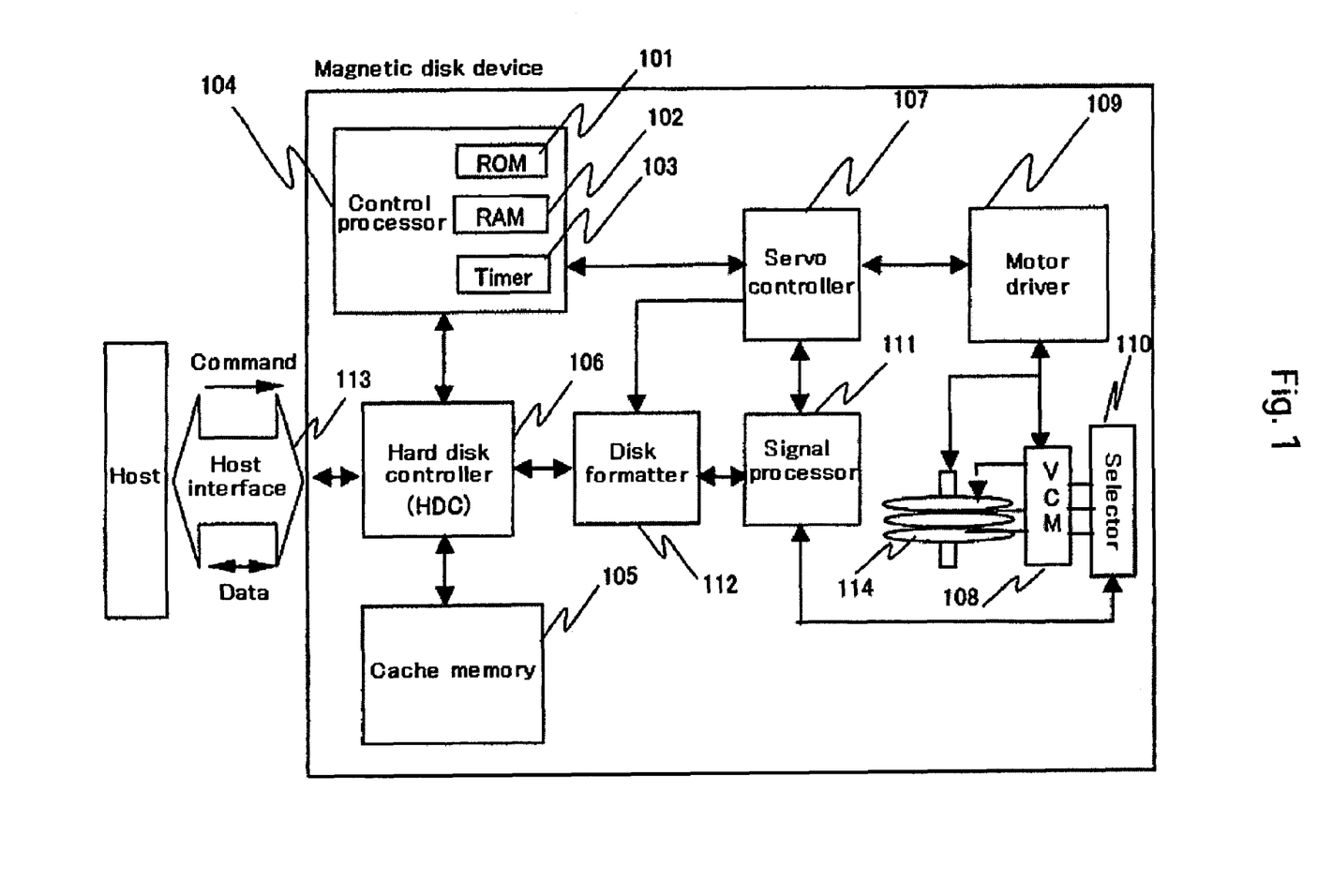
FIG. 1 is a diagram showing a structural example of a disk device according to an embodiment of the present invention.

An example of a disk device applying the present invention is shown in FIG. 1. This disk device includes: a program ROM 101 in which a read-ahead control program is mounted; a RAM 102 for storing a management table of cache internal data and a management table of cache area data; a timer 103 for managing and setting the internal time-of-day of the disk device; a control processor (CPU) 104 having the above ROM 101, RAM 102, and timer 103 built thereinto, and for reading in and executing a control program stored within the ROM; a cache memory 105 for temporarily writing read request data/write request data; a hard disk controller (HDC) 106 that controls data transfer between a host and the cache memory 105 and between the cache memory 105 and a disk; a servo controller 107 that conducts control for moving a read/write head of the device to a specified position on the disk 114 when data is read/written; a voice coil motor (VCM) 108 for moving the head in accordance with the instructions sent from the servo controller; a motor driver 109 for controlling disk rotation; a selector 110 for selecting only signals of a specified head, from the magnetic signals read in from the head; a signal processor 111 for converting the analog data sent from the selector 110, into digital data, or converting the digital data sent from the HDC 106, into analog data; a disk formatter 112 that opens/closes a reading gate and transfers the read data sent from the signal processor 111, to the cache memory 105, or that opens/closes a writing gate and transfers the write data transferred from the cache memory 105, to the signal processor 111; and an interface controller 113 for exchanging commands and data with the host.

Figure 2:
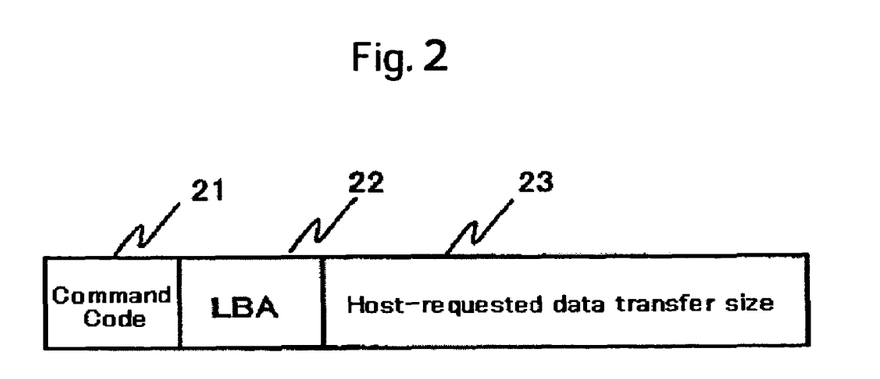
FIG. 2 is a diagram showing a structural example of a command issued from a host.

A structural example of a command issued from the host is shown in FIG. 2. The command includes a command code 21 that indicates the type of command, a logic block address (LBA) 22 of the data read/written, and a host-requested data transfer size 23 indicating a size of host-requested data. The command code 21 allows the disk device to distinguish between AV commands and PC commands. The command code in ATA/ATAPI 7 (draft), for example, is 25h for a "READ DMA EXT" PC command or 2Ah for a "READ STREAM DMA EXT" AV command.

Figure 3:
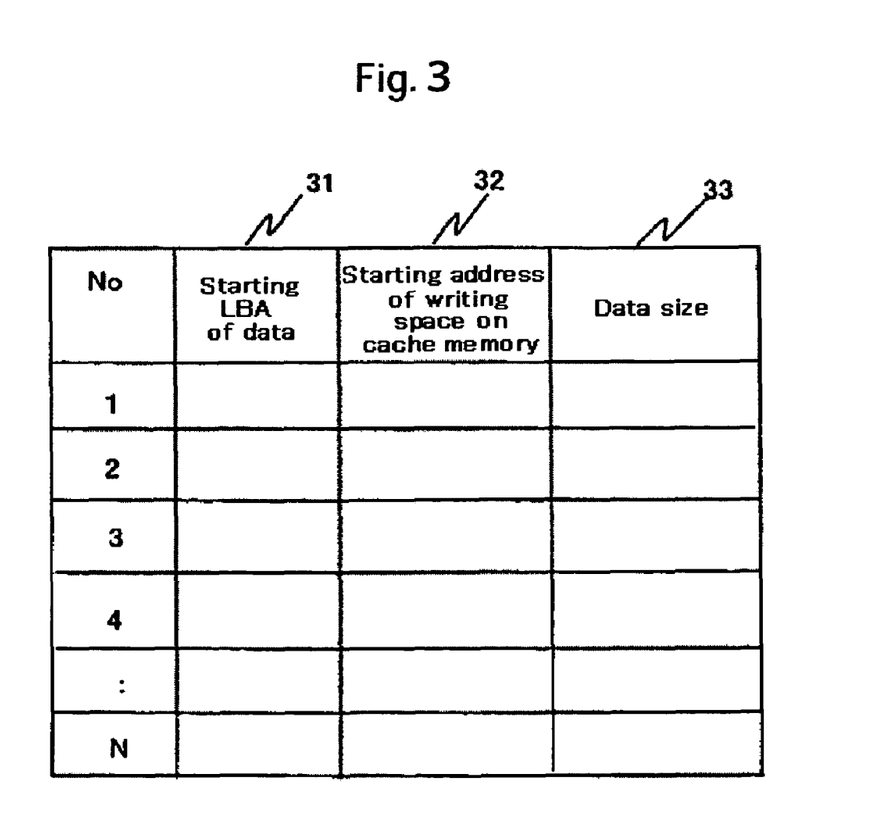
FIG. 3 is a diagram showing a structural example of a cache data management table.

A structural example of a cache data management table is shown in FIG. 3. The cache data management table includes a starting LBA 31 of the data written into the cache memory 105, a starting address 32 of a writing space on the cache memory, and a data size 33. Since independent data is written into each of plural divided cache areas, the cache data management table is also set for each cache area.

Figure 4:
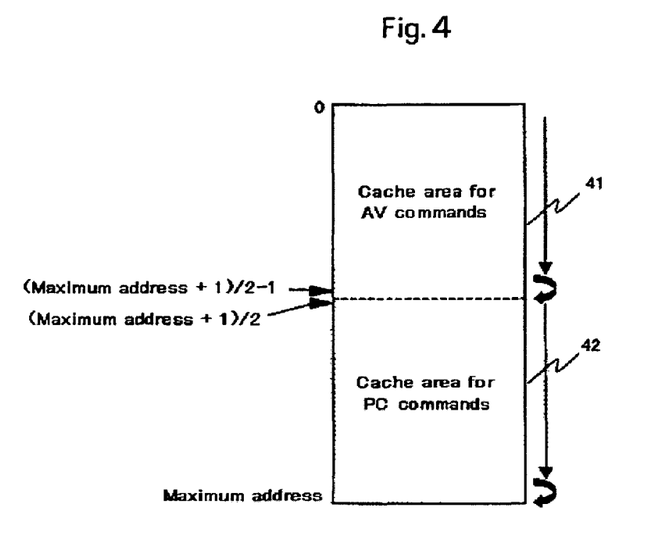
FIG. 4 is a diagram showing an example of dividing a cache area.

An example of dividing a cache area into an area 41 for AV commands and an area 42 for PC commands, is shown in FIG. 4. The direction of data writing into the areas is indicated by an arrow. The starting address of the area for AV commands is 0, and the ending address is (maximum address+1)/2−1. The starting address of the area for PC commands is (maximum address+1)/2, and the ending address is the maximum address. In both cache areas, wrap-around process is executed at the ending address. The wrap-around process can be established by setting the starting address and the ending address in a register of the HDC 106.

Figure 5:
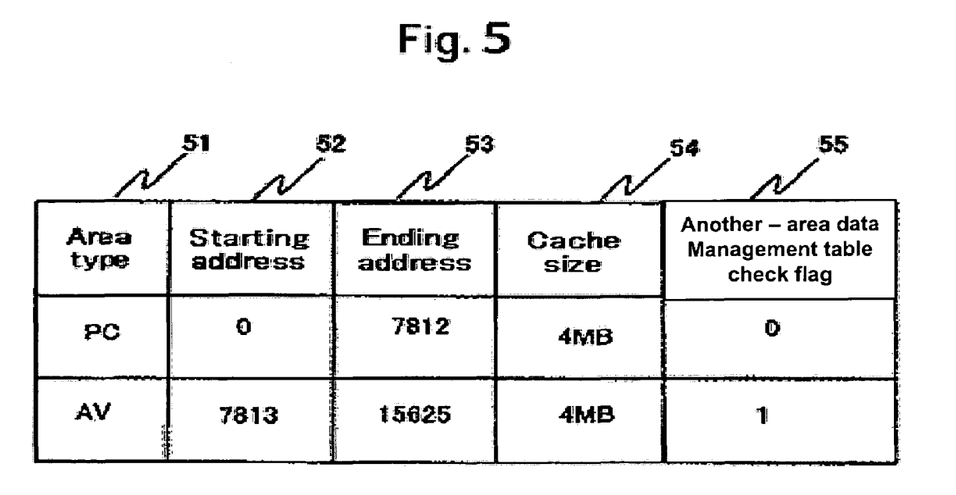
FIG. 5 is a diagram showing a structural example of a cache area management table.

A structural example of a cache area management table is shown in FIG. 5. The cache area management table includes an area type 51, a starting address 52 of the area, an ending address 53, a size 54 of the area, and a another-area data management table check flag 55 indicating whether a cache data management table of an area relating to a command type other than AV or PC needs to be checked. The another-area data management table check flag 55 identifies whether a cache data management table of an area relating to a command type other than AV or PC needs to be updated if, immediately after cache area division, data for each command type is not properly distributed to the cache area that was allocated to a specific command type. More specifically, when data is to be written into the cache memory 105, 1 is set up if the another-area data management table needs to be updated, and 0 is set up if the another-area data management table does not need to be updated. In other words, the flag is set to have a value of 1 immediately after a new cache area has been set in an existing area previously allocated to a command type, and is set to have a value of 0 when the wrap-around process is performed on the new cache area twice.

Another area data management table.:

When PC data is processed, the information about AV data is inputted.

When AV data is processed, the information about PC data is inputted.

The flow of cache control in the scheme where the area of the cache memory 105 is to be divided into two areas (one for AV commands, and one for PC commands) is shown in FIGS. 6a to 6d.

Figure 6A:
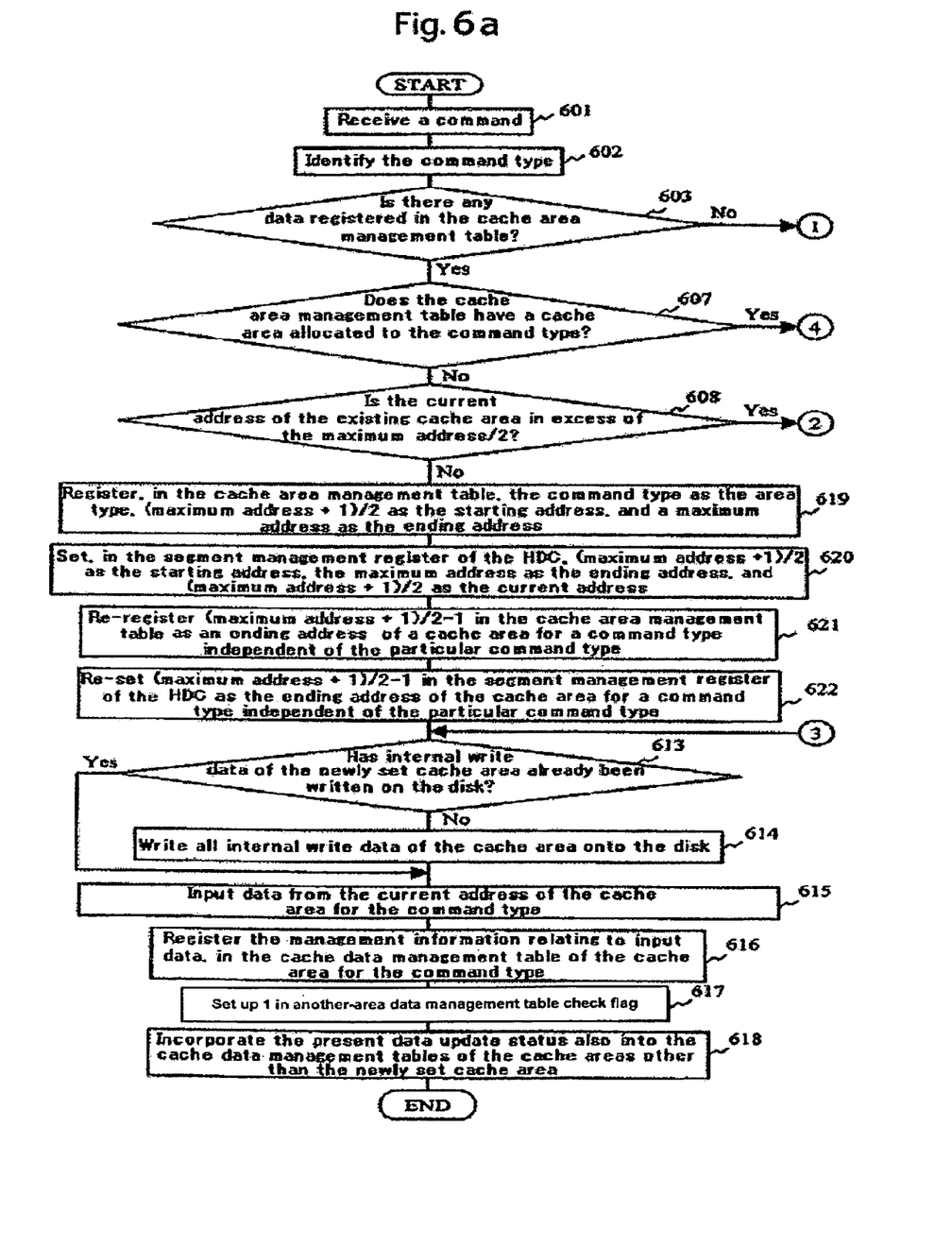
FIG. 6a is a flowchart of a cache control scheme intended for dividing a cache area into two areas according to the type of command in an embodiment of the invention.

After receiving a command in step 601, the disk device of the present embodiment identifies the command type by the command code 21 in step 602. In step 603, the device examines whether data is already registered in the cache area management table. If no data is registered, the device registers, in step 604, the particular command type as the area type 51, address 0 as the starting address 52, and a maximum address 53 as the ending address, in the cache area management table. Next, in step 605, the device sets address 0 as the starting address, the maximum address as the ending address, and address 0 as a current address, in a segment management register of the HDC. After this, the device sets the another-area data management table check flag 55 of that cache area to 0 in step 606.

Figure 7:
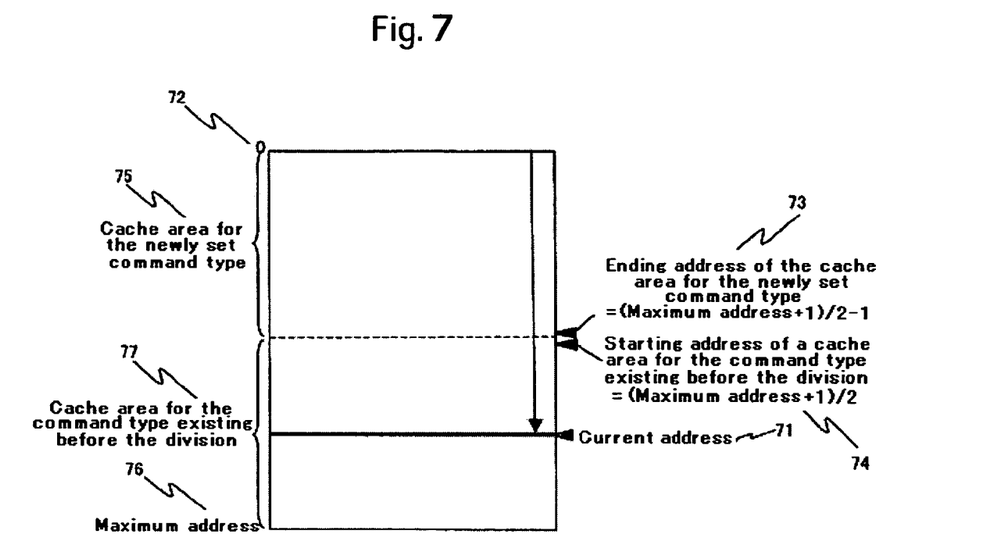
FIG. 7 is a diagram showing another example of dividing a cache area.

Referring back to step 603, if data is already registered in the cache area management table, the device examines in step 607 whether a cache area that was allocated to the command type exists in the cache area management table. If a cache area allocated to the command type does not exist in the cache area management table, whether the current address of the existing cache area is in excess of the maximum address/2 is further examined in step 608. A cache-dividing state with the current address of the existing cache area being in excess of the maximum address/2 is shown in FIG. 7 and described below.

If a current address 71 of the existing cache area is in excess of the maximum address/2, the command type is registered as the area type 51, address 0 (72) as the starting address 52, and (maximum address+1)/2−1 (73) as the ending address 53, in the cache area management table in step 609. Next, address 0 (72) is set as the starting address, (maximum address +1)/2−1 (73) as the ending address, and address 0 (72) as the current address, in the segment management register of the HDC in step 610. In step 611, (maximum address+1)/2 (74) is re-registered in the cache area management table as a starting address 52 of a cache area for a command type independent of the particular command type. In step 612, the above-mentioned starting address 52 is re-set as (maximum address+1)/2 (74) in the segment management register of the HDC. After the division, the area from address 0 (72) to the address of (maximum address+1)/2−1 (73) becomes a cache area (75) for the newly set command type. Also, the area from (maximum address+1)/2 (74) to a maximum address (76) becomes a cache area (77) for the command type existing before the division was conducted.

Figure 6B:
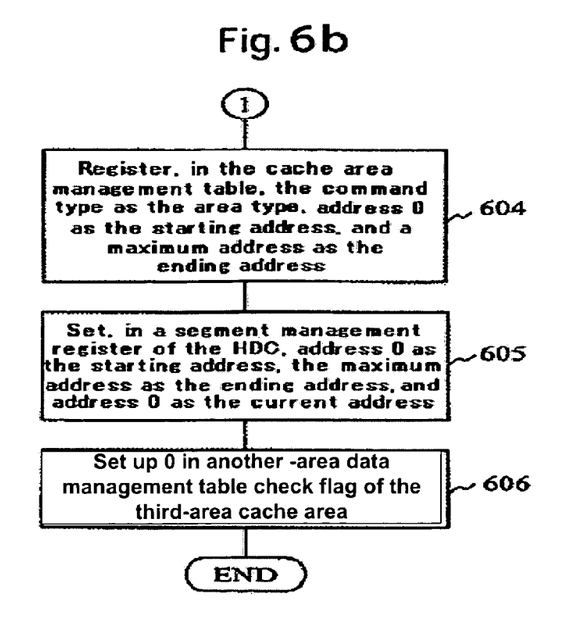
FIG. 6b is a flowchart showing one section in the above cache control scheme for dividing a cache area into two areas according to the type of command in an embodiment of the invention.

Next, whether internal write data of the newly set cache area has already been written on the disk is examined in step 613. If no such data is written on the disk, all write data within the cache area is written onto the disk in step 614. In step 615, data is input from the current address of the cache area for the command type. In step 616, management information on input data is registered in the cache data management table of the cache area for the command type. In step 617, 1 is set up in the another-area data management table check flag. Next, in step 618, the present data update status is also incorporated into the cache data management tables of the cache areas other than the newly set cache area.

Referring back to step 613, if the internal write data of the newly set cache area has already been written on the disk, data is input from the current address of the cache area for the command type in step 615. In step 616, management information on input data is registered in the cache data management table of the cache area for the command type. In step 617, 1 is set up in the another-area data management table check flag. Next, in step 618, the present data update status is also incorporated into the cache data management tables of the cache areas other than the newly set cache area.

Figure 8:
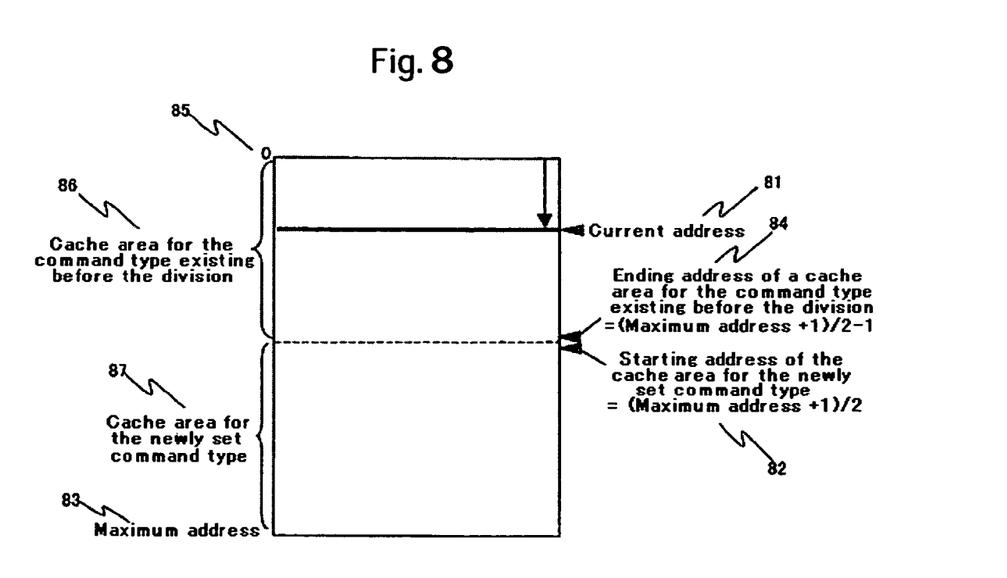
FIG. 8 is a diagram showing yet another example of dividing a cache area.

A cache-dividing state with the current address of the existing cache area not being in excess of the maximum address/2 is shown in FIG. 8. A cache-dividing process with the current address of the existing cache area not being in excess of the maximum address/2 is described below with reference to FIG. 8.

Referring back to step 608, if a current address (81) of the existing cache area is not in excess of the maximum address/2, the command type is registered as the area type 51, (maximum address+1)/2 (82) as the starting address 52, and a maximum address (83) as the ending address 53, in the cache area management table in step 619. Next, (maximum address+1)/2 (82) is set as the starting address, the maximum address (83) as the ending address, and (maximum address+1)/2 (82) as the current address, in the segment management register of the HDC in step 620. In step 621, (maximum address+1)/2−1 (84) is re-registered in the cache area management table as an ending address 53 of a cache area for a command type independent of the particular command type. In step 622, (maximum address+1)/2−1 (84) is re-set as the above-mentioned ending address 53 in the segment management register of the HDC. After the division, the area from address 0 (85) to the address of (maximum address+1)/2−1 (84) becomes a cache area (86) for the command type existing before the division was conducted. Also, the area from (maximum address+1)/2 (82) to the maximum address (83) becomes a cache area (87) for the newly set command type.

Figure 6C:
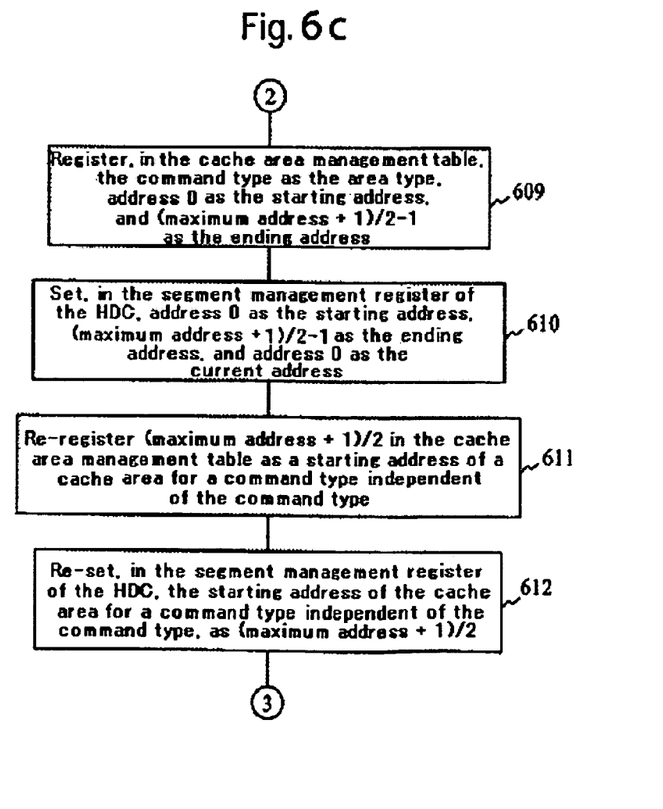
FIG. 6c is a flowchart showing another section in the above cache control scheme for dividing a cache area into two areas according to the type of command in an embodiment of the invention.

Next, whether internal write data of the newly set cache area has already been written on the disk is examined in step 613. If no such data is written on the disk, all write data within the cache area is written onto the disk in step 614. In step 615, data is input from the current address of the cache area for the command type. In step 616, management information on input data is registered in the cache data management table of the cache area for the command type. In step 617, 1 is set up in the another-area data management table check flag. Next, in step 618, the present data update status is also incorporated into the cache data management tables of the cache areas other than the newly set cache area.

Referring back to step 613, if internal write data of the newly set cache area has already been written on the disk, data is input from the current address of the cache area for the command type in step 615. In step 616, management information on input data is registered in the cache data management table of the cache area for the command type. In step 617, 1 is set up in the another-area data management table check flag. Next, in step 618, the present data update status is also incorporated into the cache data management tables of the cache areas other than the newly set cache area.

Figure 6D:
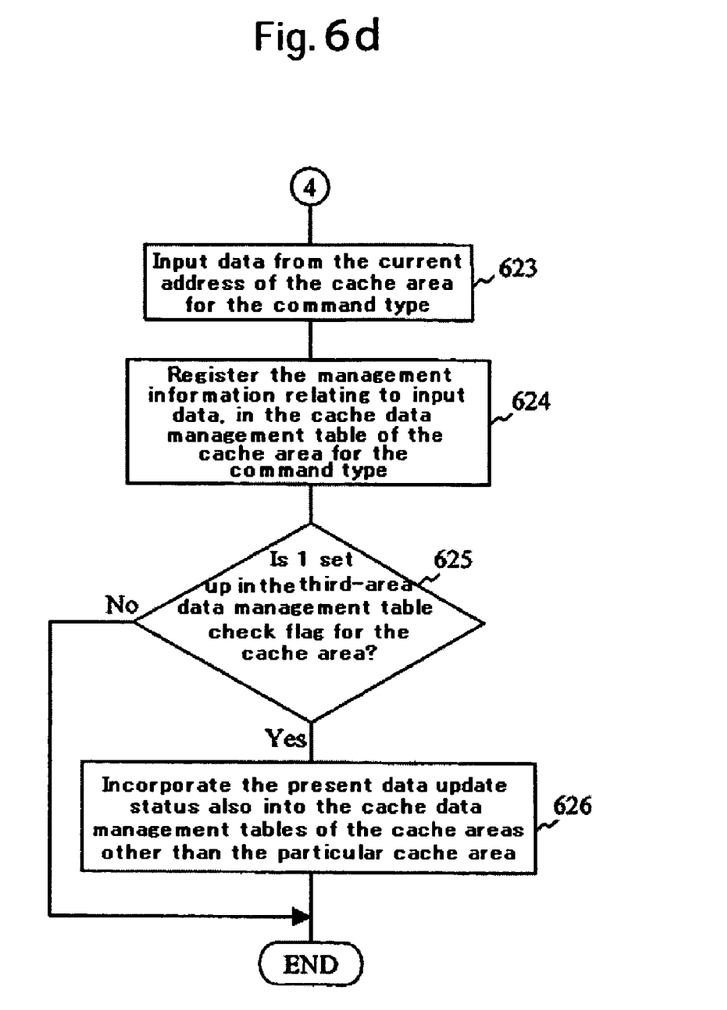
FIG. 6d is a flowchart showing yet another section in the above cache control scheme for dividing a cache area into two areas according to the type of command in an embodiment of the invention.

Referring back to step 607, if the cache area that was allocated to the command type is present in the cache area management table, data is input, in step 623, from the current address of the cache area for the command type. In step 624, management information on input data is registered in the cache data management table of the cache area for the command type. Next, whether 1 is set up in the another-area data management table check flag for the cache area is examined in step 625. If 1 is set up in the check flag, the present data update status is also incorporated into the cache data management tables of the cache areas other than the particular cache area (step 626). Referring back to step 625, if 1 is not set up in the check flag, the process is terminated.

Figure 9:
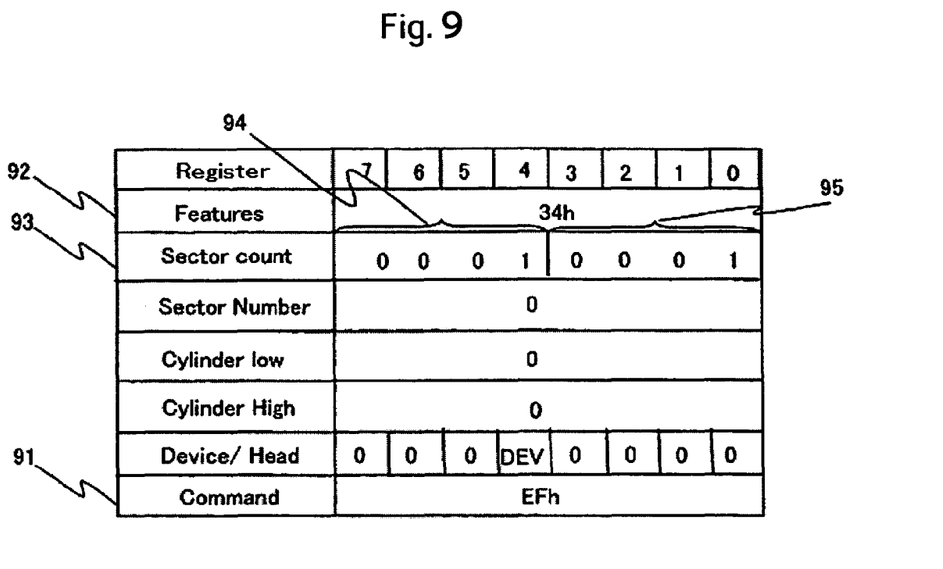
FIG. 9 is a diagram showing an example of an ATA command intended for device operation setup.

An example of an operation setup command for the device is shown in FIG. 9. A code that identifies the command type for device setup is assigned as a "Command Code" 91. "Features" 92 indicate details of the operation setup. Although a code for cache area division is not present in the standard specifications of ATA commands, it is possible to newly set such a code. It is possible to assign a cache area division code in the "Features" and set a ratio between the PC command area and the AV command area by using a bit [7:4] 94 of a "Sector Count" 93 and a bit [3:0] 95 thereof, respectively. For example, as shown in FIG. 9. it is possible to set the ratio between both command areas to 1:1 by entering 0001 in both bits [7:4] 94 and [3:0] 95.

The use of such command as shown in FIG. 9 also makes it possible to divide the cache area on the basis of an AV command area PC command area ratio specified from the host. Although FIGS. 6a, 6b, and 6c show the process flow in which the cache area is divided into the PC command area and the AV command area at the ratio of 1:1, the dividing ratio can also be a ratio specified from the host by using such command as shown in FIG. 9.

While, as described above, the ratio between the cache areas for each command type can be specified from the host, use of command issuance intervals for each command type also allows a suitable ratio to be calculated and set from the disk. In this case, however, the cache area is not divided immediately after a new command type has been received. Instead, conventional cache control is executed for a while after receipt of a new command type. For example, a command issuance interval for the new command type is measured and then a suitable dividing ratio is determined on the basis of that value before the dividing process is executed.

Figure 10:
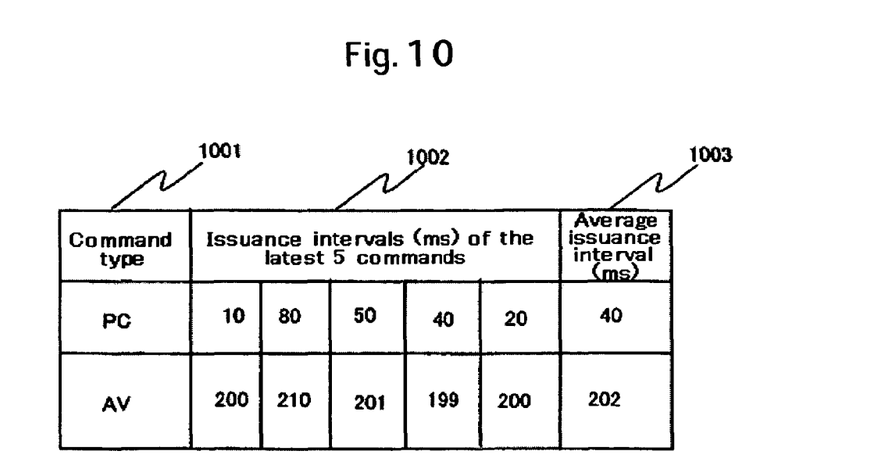
FIG. 10 is a diagram showing a structural example of a command issuance interval registration table.

A structural example of a command issuance interval registration table is shown in FIG. 10. The command issuance interval registration table includes a command type 1001, issuance intervals 1002 of the latest five commands, and average issuance intervals 1003. In the command issuance interval registration table, the issuance intervals of the latest commands are registered for each command type. Calculation results relating to average issuance intervals, based on registered issuance intervals, are further registered. If, as in FIG. 10, the average issuance interval of PC commands and that of AV commands are taken as 40 ms and 200 ms, respectively, the ratio between the PC command area and the AV command area can be set as 5:1, for example. Execution of the dividing process, based on this ratio, is also possible.

The following describes an example in which, if one of the two areas into which the original cache area was divided is not used within a fixed time (if no commands are issued within a fixed time that belong to the command type to which a cache area was allocated), the particular area is to be integrated with the other cache area.

Figure 11:
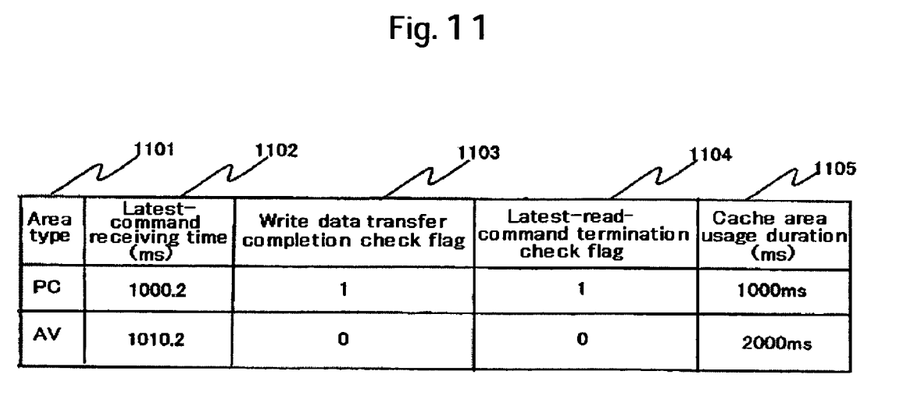
FIG. 11 is a diagram showing a structural example of a cache status management table.

A structural example of a cache status management table is shown in FIG. 11. The cache status management table includes an area type 1101 for each command type, latest-command receiving time 1102 for each area type, a write-data transfer completion check flag 1103, latest-read-command termination check flag 1104, and a cache area usage duration (ms) 1105 for each cache area. The receiving time of the latest command is registered for each area type (command type) as the latest-command receiving time 1102. The time is acquired with reference to the built-in timer 103 of the CPU. The write-data transfer completion check flag 1103 identifies whether the write data within the cache area set for each command type has already been transferred to the disk. If the data has already been transferred, 1 is input to the check flag 1103. If the data is not yet transferred, 0 is input to the check flag. If the latest read command has already been processed to completion, 1 is set up in the latest-read-command termination check flag 1104. If the latest read command is not yet processed to completion, 0 is set up in the check flag.

Figure 12:
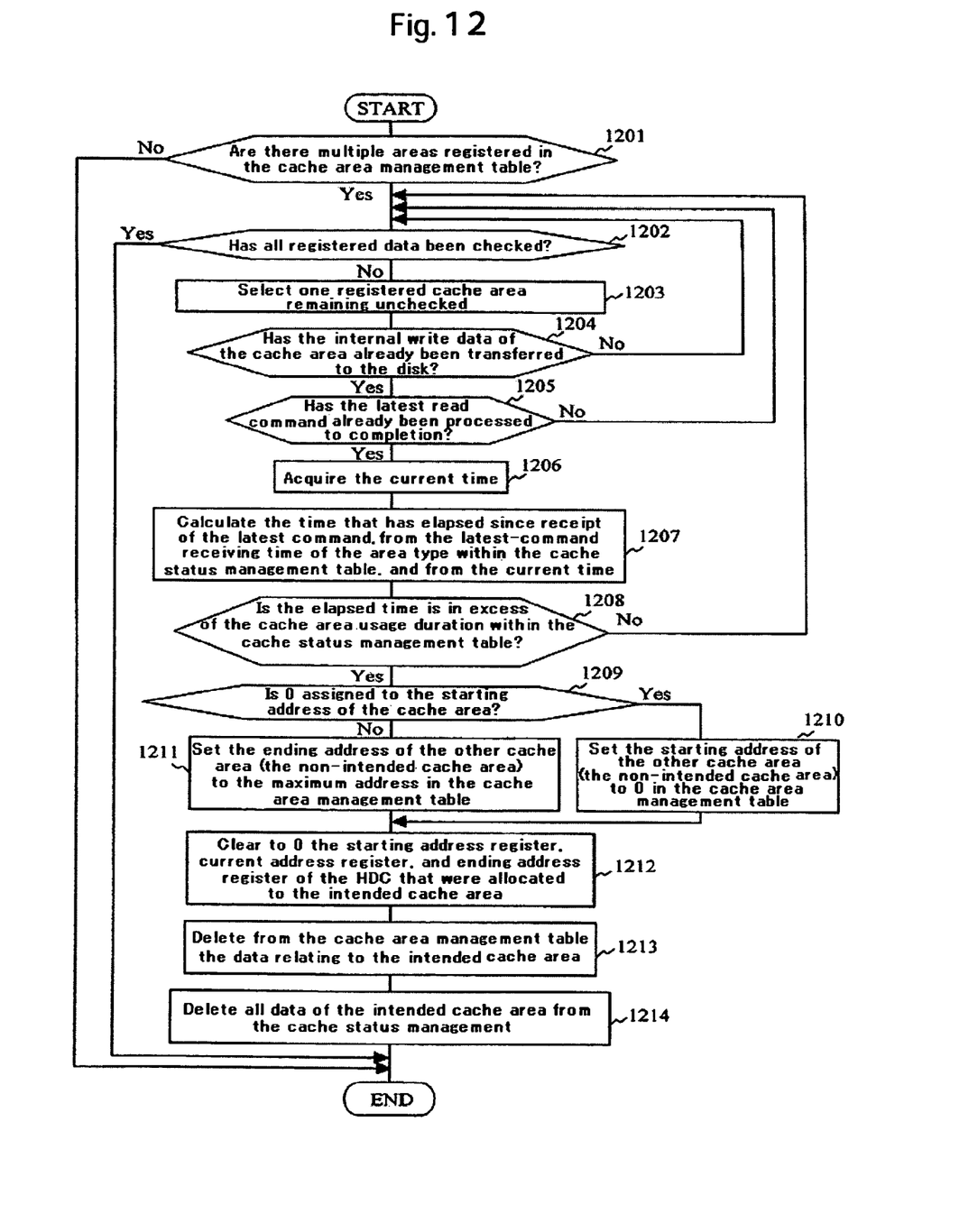
FIG. 12 is a flowchart of processing in which one of two areas into which an original cache area was divided is to be integrated with the other cache area within a fixed time after receipt of the latest command according to an embodiment of the invention.

The flow of processing in which one of the two areas into which the original cache area was divided is to be integrated with the other cache area within a fixed time after receipt of the latest command is shown in FIG. 12. Processing shown in FIG. 12 assumes execution at fixed time intervals by firmware mounted in the ROM 101.

Whether multiple areas are registered in the cache area management table is examined in step 1201, and if multiple areas are not registered, processing is terminated. If multiple areas are registered in the cache area management table, it is examined in step 1202 whether all registered data has been checked. If not all of the registered data has been checked, one registered cache area remaining unchecked is selected in step 1203. Next, whether the write data within that cache area has already been transferred to the disk is examined in step 1204 using the cache status management table. If neither the write data within the cache area has been transferred ("No" in step 1204) nor has all registered data been checked ("No" in step 1202), another registered cache area remaining unchecked is selected in step 1203. If the write data within the cache area has already been transferred ("Yes" in step 1204), whether the latest read command of the cache area type has already been processed to completion is examined in step 1205 using the cache status management table. If neither the latest read command of the cache area type has already been processed to completion ("No" in step 1205) nor has all registered data been checked ("No" in step 1202), yet another registered cache area remaining unchecked is selected in step 1203.

If the latest read command of the cache area type has already been processed to completion ("Yes" in step 1205), the current time is acquired with reference to the built-in timer 103 of the CPU 104 in step 1206. Next, in step 1207, the time that has elapsed since the latest command was received is calculated from the latest-command receiving time 1102 of the area type within the cache status management table, and from the current time. Next, whether the time that has elapsed is in excess of the cache area usage duration 11 05 within the cache status management table is examined in step 1208. If the time that has elapsed is not in excess of the cache area usage duration 1105, it is examined back in step 1202 whether all registered data has been checked. If not all of the registered data has been checked, further another registered cache area remaining unchecked is selected in step 1203.

If the time that has elapsed is in excess of the cache area usage duration 11 05 within the cache status management table, whether the starting address 52 of the cache area is 0 is examined in the cache area management table in step 1209. If the starting address 52 of the cache area is 0, the starting address 52 of the other cache area (the non-intended cache area) is set to be 0 in the cache area management table in step 1210. If the starting address 52 of the intended cache area is not 0, the ending address 53 of the other cache area (the non-intended cache area) is set to be the maximum address in the cache area management table in step 1211. Next, the starting address register, current address register, and ending address register of the HDC that were allocated to the intended cache area are all cleared to 0 in step 1212. After this, data relating to the intended cache area is deleted from the cache area management table in step 1213, and then all data of the intended cache area is deleted from the cache status management table in step 1214.

The cache areas previously allocated to each command type can also be released and integrated by issuing an instruction from the host. More specifically, the release and the integration can be specified using such operation setup command for the device as shown in FIG. 9. Assume, for example, that the data indicating the type of operation for releasing and integrating the cache area is set in "Features" 92 of the command in FIG. 9, and that 0001 indicating the ratio of the PC command area or 0000 indicating the ratio of the AV command area is set in bit [7:4] 94 or bit [3:0] 95, respectively. It is thus possible to specify releasing the area previously allocated for AV use, and integrating this area for PC use only.

Figure 13:
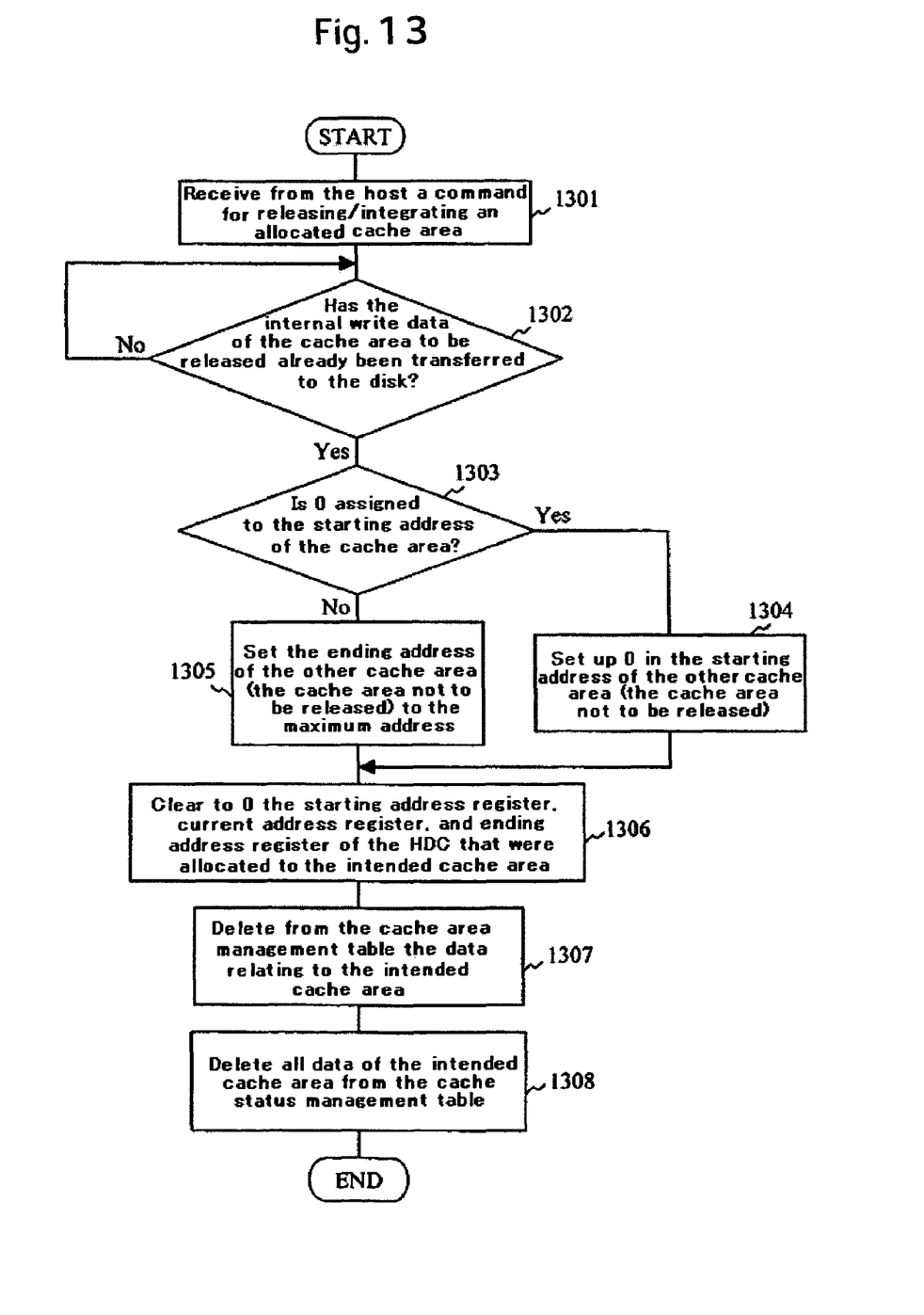
FIG. 13 is a flowchart of processing in which the two areas into which the original cache area was divided according to the type of command are to be integrated into one area by issuing an instruction from the host according to an embodiment of the invention.

The flow of processing in which the two areas into which the original cache area was divided according to the type of command are to be integrated into one area by issuing an instruction from the host, is shown in FIG. 13. After a command for releasing/integrating an allocated cache area has been received from the host in step 1301, whether the write data within the cache area to be released has already been transferred to the disk is examined in step 1302. After the transfer of the write data from the above cache area to the disk has been confirmed, whether the starting address 52 of the cache area is 0 is examined in step 1303 using the cache area management table. If the starting address 52 of the cache area is 0, the starting address 52 of the other cache area (the cache area not to be released) is set to be 0 in step 1304 using the cache area management table. If the starting address 52 of the intended cache area is not 0, then in step 1305, the ending address 53 of the other cache area (the cache area not to be released) is set to be the maximum address by use of the cache area management table. Next, the starting address register, current address register, and ending address register of the HDC that were allocated to the intended cache area are all cleared to 0 in step 1306. After this, data relating to the intended cache area is deleted from the cache area management table in step 1307, and then all data of the intended cache area is deleted from the cache status management table in step 1308.

In this way, the disk device of the present embodiment also allows the cache area within the disk device to be divided and integrated by issuing instructions from the host.

Figure 14:
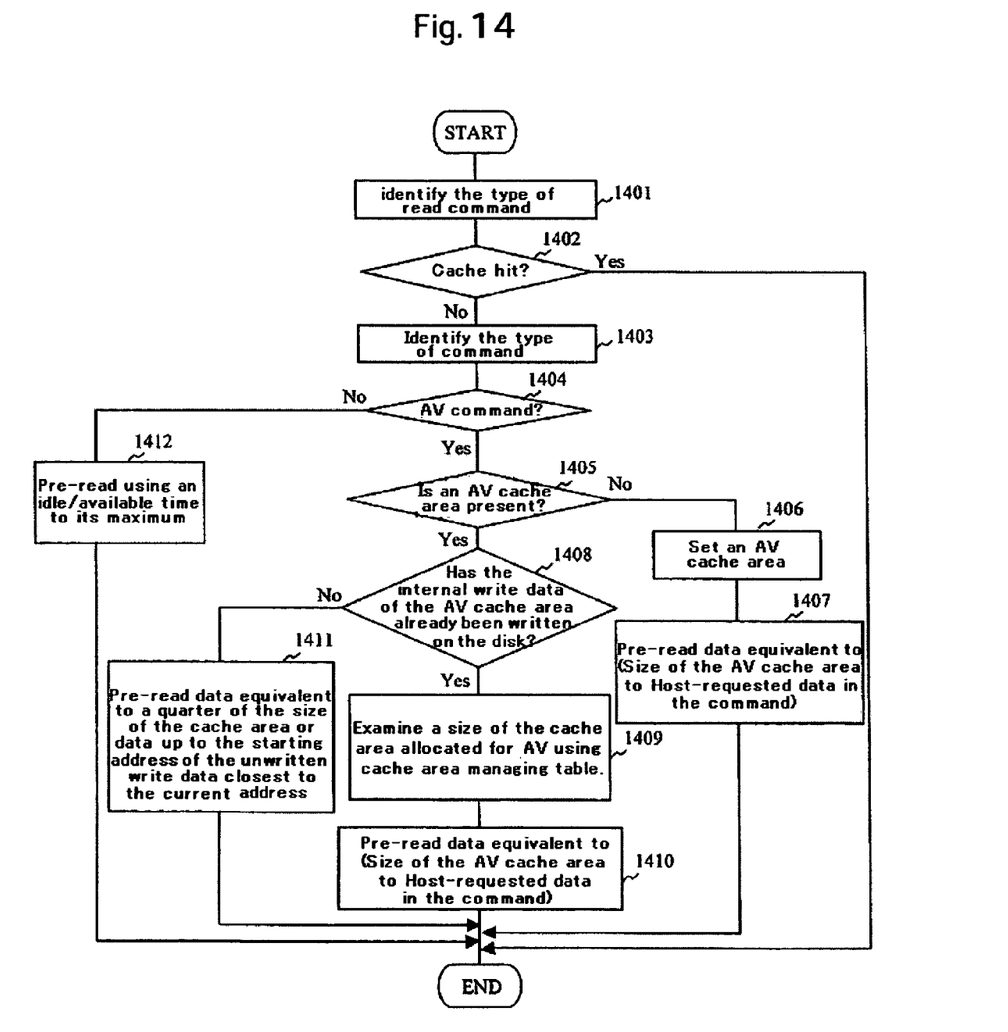
FIG. 14 is a flowchart of the control intended to select independent read-ahead schemes for an AV command type and a PC command type each according to an embodiment of the invention.

The flow of control for selecting independent read-ahead schemes for the AV command type and the PC command type each is shown in FIG. 14. The type of read command is identified in step 1401, and whether host-requested data hits the cache is examined in step 1402. If the data hits the cache, processing is terminated. If the data does not hit the cache, the type of command is identified in step 1403. If the results indicating that the command type is AV are presented in step 1404, whether an AV cache area exists is examined in step 1405. If an AV cache area does not exist, the AV cache area is set in step 1406. Next, data equivalent to (Size of the AV cache area—Host-requested data in the command) is pre-read in step 1407.

Referring back to step 1405, if an AV cache area exists, it is then examined in step 1408 whether the write data within the AV cache area has been written on the disk. If the write data within the AV cache area has been written on the disk, a size of the cache area allocated for AV is examined in step 1409 using the cache area management table. Next, data equivalent to (Size of the AV command area—Host-requested data in the command) is pre-read in step 1410.

Referring back to step 1408, it is examined whether the write data within the AV cache area has been written on the disk. If the write data has not been written, data equivalent to a quarter of the size of the cache area or data up to the starting address of the unwritten write data closest to the current address is pre-read in step 1411.

Control is further returned to step 1404, and if the command is not an AV command, read-ahead that uses an idle/available time to its maximum is conducted in step 1412 as in the conventional technologies.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk device comprising:
   a disk;
   a cache memory for temporarily saving data read in from the disk and data transferred from a host; and
   a controller configured to control data transfer between the cache memory and the host and between the cache memory and the disk;
   wherein the controller is configured to set in the cache memory an independent cache area for each type of command for application programs each different in data-processing policy; and includes a cache data management table to manage the data written into the cache area for each of the cache areas,
   wherein the cache data management table registers management information of the cache area based on the command type,
   wherein the controller is configured to change a read-ahead method according to the type of command, and
   wherein the read-ahead method differs between an AV data-processing command and a PC application program command;
   wherein the controller is configured to determine a maximum allocated cache area for the AV data-processing command, and to change the data read-ahead method from pre-reading data over an entire space of said determined maximum allocated cache area using the AV data-processing command to pre-reading data into the cache memory over an entire period of a maximum usable pre-reading time interval using the PC application program command, and vice versa.

2. The disk device according to claim 1, wherein the controller is configured to set an independent cache area for an AV data-processing command and a PC application program command each.

3. The disk device according to claim 1, wherein the controller is configured to receive from the host an instruction on a ratio of the cache areas for the command types, and to set in the cache memory in accordance with the ratio, the cache area for each of the command types.

4. The disk device according to claim 1, wherein the controller is configured to determine, subject to frequency of command issuance for each of the command types, a ratio of the cache areas to be set for the command types.

5. The disk device according to claim 1, further comprising a table to hold a latest-command receiving time for each of the command types and a cache area usage duration previously set for each command type, wherein the controller is configured to release the cache area allocated to the command type whose elapsed time from the latest-command receiving time has exceeded the cache area usage duration and to integrate the cache area with the cache area allocated to any one of the other command types.

6. The disk device according to claim 1, wherein in accordance with an instruction from the host, the controller is configured to release the cache area previously allocated to a specific command type and to integrate the cache area with the cache area allocated to any one of the other command types.

7. A method of cache control in a disk drive having a disk and a cache memory for temporarily saving data read in from the disk and data transferred from a host, the method comprising:
   identifying a type of command received;
   checking a cache management table in the cache memory;
   when, as a result of the checking, a cache area allocated to a first type of command identified in the identifying does not exist in the cache memory and a cache area allocated to a second type of command for an application program different from a cache area of the first type of command in terms of data-processing policy exists in the cache memory, determining whether a current address of the existing cache area is in excess of a required address; and
   if, in the determining, the current address is in excess of the required address, setting an area from address 0 of the cache memory to the required address minus 1, as a cache area with respect to the first type of command, and setting an area from the required address to a maximum address, as a cache area with respect to the second type of command,
   wherein the cache management table registers management information of the cache area based upon the command type; and
   changing a data read-ahead method according to the particular command type, wherein the data read-ahead method is changed between an AV data-processing command and a PC application program command;
   determining a maximum allocated cache area for the AV data-processing command; and
   wherein changing the data read-ahead method comprises changing from pre-reading data over an entire space of said determined maximum allocated cache area using the AV data-processing command to pre-reading data into the cache memory over an entire period of a maximum usable pre-reading time interval using the PC application program command, and vice versa.

8. The method of cache control according to claim 7, wherein the first type of command is a command for AV data processing, and the second type of command is a command for an application program.

9. The method of cache control according to claim 7, further comprising:
   receiving from the host an instruction on a dividing ratio of the cache areas; and
   determining the required address in the basis of the instruction.

10. The method of cache control according to claim 7, further comprising:
    collecting issuance intervals of commands of the first type and information on the issuance intervals of the commands of the first type; and
    determining a required address on the basis of the information.

11. The method of cache control according to claim 7, further comprising:
    determining for each of the command types whether an elapsed time from a latest-command receiving time has exceeded a previously set cache area usage duration; and
    when there is present a command type whose elapsed time from the latest-command receiving time has exceeded the cache area usage duration, releasing the cache area allocated to the command type, and integrating the cache area with the cache area allocated to any one of the other command types.

12. A method of cache control in a disk drive having a disk, the method comprising:
    providing a cache memory for temporarily saving data read in from the disk and data transferred from a host;
    providing a controller to control data transfer between the cache memory and the host and between the cache memory and the disk;
    setting in the cache memory an independent cache area for each type of command for application programs each different in data-processing policy;
    providing a cache data management table to manage the data written into the cache area for each of the cache areas, and
    changing a read-ahead method according to the particular command type, wherein the first type of command is a command for AV data processing, and the second type of command is a command for an application program;
    determining a maximum allocated cache area for the AV data-processing command; and
    wherein the step of changing a read-ahead method comprises changing from pre-reading data over an entire space of said determined maximum allocated cache area using the AV data-processing command to pre-reading data into the cache memory over an entire period of a maximum usable pre-reading time interval using the PC application program command, and vice versa.

13. The method of cache control according to claim 12, determining for each of the command types whether an elapsed time from a latest-command receiving time has exceeded a previously set cache area usage duration; and
    when there is present a command type whose elapsed time from the latest-command receiving time has exceeded the cache area usage duration, releasing the cache area allocated to the command type, and integrating the cache area with the cache area allocated to any one of the other command types.

* * * * *

UNITED STATES PATENT AND TRADEMARK OFFICE
CERTIFICATE OF CORRECTION

PATENT NO. : 7,539,820 B2  Page 1 of 1
APPLICATION NO. : 11/109922
DATED : May 26, 2009
INVENTOR(S) : Hiratsuka It is certified that error appears in the above-identified patent and that said Letters Patent is hereby corrected as shown below:

Claim 9, column 11, line 55, please delete "in the basis" and insert -- on the basis --

Signed and Sealed this

Twenty-eighth Day of July, 2009

JOHN DOLL
*Acting Director of the United States Patent and Trademark Office*